W. A. LORENZ.
MANUFACTURE OF GASKETS.
APPLICATION FILED NOV. 30, 1906.
929,679. Patented Aug. 3, 1909.
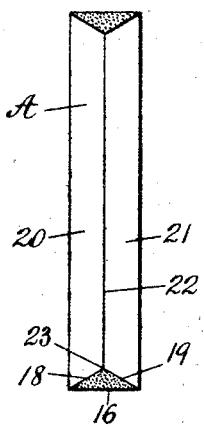
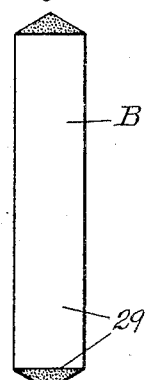
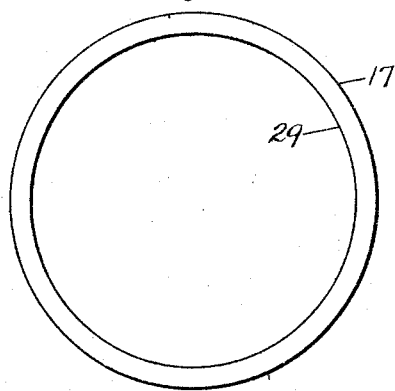
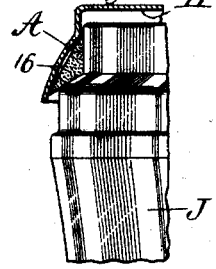
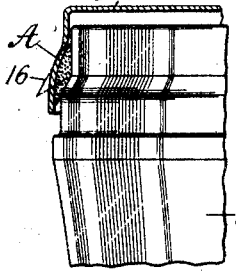
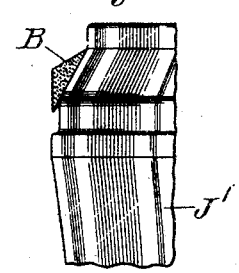
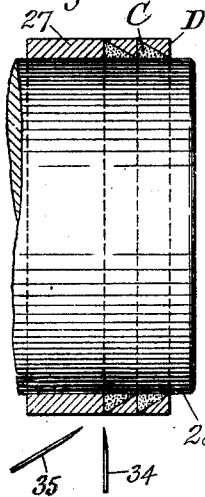
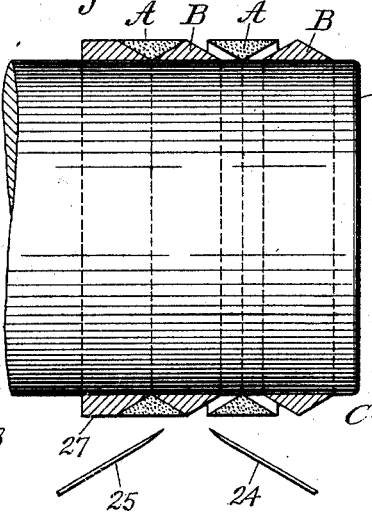
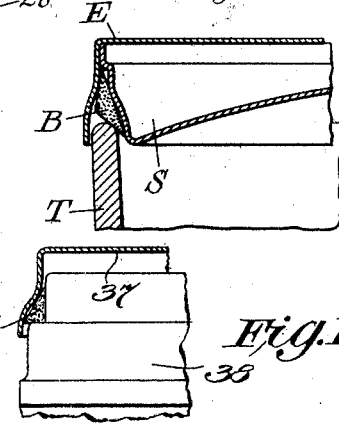
Witnesses:
H. Mallner
James S. Ellsworth
Inventor
William A. Lorenz
By Wm H Honiss, Atty.

UNITED STATES PATENT OFFICE.

WILLIAM A. LORENZ, OF HARTFORD, CONNECTICUT, ASSIGNOR OF ONE-FOURTH TO HIMSELF, ONE-FOURTH TO WILLIAM H. HONISS, OF HARTFORD, CONNECTICUT, AND ONE-HALF TO BEECH-NUT PACKING COMPANY, OF CANAJOHARIE, NEW YORK, A CORPORATION OF NEW YORK.

MANUFACTURE OF GASKETS.

No. 929,679.  Specification of Letters Patent.  Patented Aug. 3, 1909.

Application filed November 30, 1906. Serial No. 345,623.

*To all whom it may concern:*

Be it known that I, WILLIAM A. LORENZ, a citizen of the United States, and resident of Hartford, in the county of Hartford and State of Connecticut, have invented certain new and useful Improvements in Manufacture of Gaskets, of which the following is a full, clear, and exact specification.

This invention consists in an improved gasket, and method of manufacturing gaskets for hermetic closures.

Figures 1 and 2 are sectional views of two triangular gaskets of reverse contour. Fig. 3 is an end view of the gaskets of Figs. 1 and 2. Figs. 4, 5 and 6 are fragmentary side views of the tops of jars, showing gaskets in sealing position thereon, the jar of Fig. 5 being broken away at its middle. Fig. 7 is a fragmentary and enlarged sectional view of the top of a plain rimmed tumbler with a gasket and cap in sealing position thereon. Figs. 8 and 9 are plan views of apparatus for producing these gaskets, two different gasket contours being shown. Fig. 10 is a fragmentary side view of a jar similar to that of Figs. 4 and 5, provided with a closure employing one of the gaskets of Fig. 9.

The forms of gasket shown in the drawings are well adapted for use in the hermetic sealing of jars and other vacuum receptacles, particularly in connection with what are known as wedging closures, being applied thereto as illustrated in Figs. 4, 5, 6 and 7. The gasket, after being placed as shown in these figures, is compressed at an angle against its sealing seat on the receptacle by means of a tapering or flaring cap.

By the present invention I am enabled to make these ring gaskets of triangular and some other forms of cross section by expeditious methods of cutting them from cylindrical tubing, and without any waste of the gasket material.

This improved process consists in separating the rings from a tube of gasket material, by a succession of circumferential cuts, differing in angular relation to the longitudinal center of the tube, to form alternate rings of reverse contour, and then reversing the alternate rings to bring them all to uniform contour.

A form of gasket well adapted for use with wedging closures is the gasket A of Fig. 1. The cross-section of this gasket is that of a rather flat isosceles triangle, the long side 16 of which is coincident with the outer cylindrical surface 17 of Fig. 3. The inclined lines 18 and 19 of the cross section are coincident with the interior conical surfaces 20 and 21 of the gasket, which meet along the line 22, the apex 23 of the cross-sectioned triangle coinciding with this line.

The gasket B of Fig. 2 has a contour which is the reverse of the contour of the gasket A, the parallel cylindrical surface 29 being on the inside, and the apex 30 of the triangular cross-section on the outside. On account of the pliability of the rubber or other gasket material commonly used for this purpose, either of these gaskets may be turned inside out, thus reversing the triangular cross-section and thereby bringing either of them into conformity with the other, according to the form of gasket desired, which depends somewhat upon the form of the closure, or of the receptacle to be sealed. In Figs. 4 and 5 the form A of Fig. 1 is shown to be employed, while in Figs. 6 and 7, the form B is shown to be employed.

The sealing caps designated as 11 and 12 in Figs. 4 and 5 respectively are each provided with a straight upper section approximately fitting the upper end of the jar necks, and with outwardly tapering or flaring portions which bear against the oblique outer faces of the respective gaskets, the outward angle or flare of the caps being suited to the inclination of the gasket.

The flexibility of the gasket material which enables it to be reversed also enables it to conform to considerable variations in the size, or form, or inclination of the gasket seat in different forms of jars, tumblers, or other receptacles, or in the form of closure cap employed.

As shown in Fig. 4, the gasket A is inclined inwardly at the top, to conform to a parallel seat upon the jar J. In the similar jar J shown in Fig. 5, the gasket A conforms still more closely at its lower margin to the adjacent rounded shoulder of the gasket seat, the change in cross section being seen by comparison with the dot-and-dash outline of the gasket A as it is in Fig. 4. Such a conformity of the gasket may be obtained by making the ring of a diameter considerably smaller than that of the jar neck, so that when stretched into place the circumferential constriction draws in the lower margin of the gasket.

In Fig. 6, the gasket is applied upon the tapering sealing seat of the jar J', the inner surface of the gasket inclining into conformity with the tapering seat.

In Fig. 7 the gasket B is shown to be inclined outwardly toward its upper edge to suit the space provided for it between the cap E and the coöperating inner cap or gasket support S.

Fig. 10 illustrates a jar 38 like that of Fig. 4, but having a right angled seat for receiving the right angled gasket C of Fig. 9, and being also provided with a suitable flaring cap 37.

Fig. 8 illustrates my improved method of cutting these gaskets from a rubber tube, thus producing in alternation the forms A and B of Figs. 1 and 2, respectively. In this figure, the two right hand gaskets are shown separated from the remaining gaskets. The tube is approximately of the same outer and inner diameters as the desired diameters of the gaskets, and is mounted for rotation on an axis coincident with its longitudinal center, as for example, upon the mandrel 28. The tube may be stretched over the mandrel, or held thereon in any convenient way. The cutters 24 and 25 are mounted to penetrate the tube 27 at suitable intervals along the length of the tube, these intervals being in accordance with the desired length of the gaskets. The cutters are fed toward the axis of the mandrel at the same angle to that axis as the desired angles for the thin edges of the gaskets; and they are moved along the mandrel, or the mandrel is moved longitudinally past the cutters, after each operation of the cutters. Or, if preferred, both cuts may be made with one cutter, the angle of which is alternated or otherwise properly varied with each cut.

In Fig. 9 is shown a modification of the form of gasket, with a corresponding modification in the angles of the cutting tools. In this modification the cross-section of the gaskets C and D are right angled triangles, reversed relative to each other. The gasket D is separated from the tube by the cutting tool 35, after which its counterpart gasket C is severed from the tube by the cutter 34. Either of these gaskets when reversed by turning it inside out becomes exactly like the other so that after the tube is thus cut up into these two forms of rings they may be brought into uniformity by reversing the alternate rings of either form, according to the form desired.

The cutting tools 24, 25, 34 and 35 may be held in the operator's hands and pushed through the walls of the tube alternately, in line with the desired cut, which, as shown in the drawings is in line with the position of the tools themselves. Or the tools may be mounted upon slides which are movable in the direction of the cut and adjustable to the different angles that may be required. These tools may also be mounted so as to swing in the arc of a circle, with the blades curved in substantial conformity with that arc, as shown in U. S. Patent #826,104, granted July 17, 1906 to William H. Honiss, the position of the center of swing and the radius of the arc being adapted to the different angles or curvatures of the desired cuts. Or the cutters 24 and 25, 34 and 35 may be mounted to revolve around the stationary tube and be fed inwardly so as to penetrate the wall of the tube at the desired angle and in the required succession. I prefer, however, to rotate the tubes relative to the cutting tools.

Many modifications may be made in the form, proportions and angular relation of the cuts in manufacturing gaskets by this method. The two inclined surfaces may be made at different and unequal inclinations to the axis of the gasket. Or, one cut may be made at right angles to the axis of the gasket tube; and the other cut at a less angle to that axis, as shown in Fig. 9. The cut surfaces may be made so as not to intersect each other, thus producing gaskets with a short cylindrical surface on the outside and a long cylindrical surface on the inside, or vice versa. Thus in various ways which will suggest themselves to those skilled in this art, this method may be modified to conform to different conditions, or to suit the tools or apparatus that may be best available for or adaptable to this work.

The right angled triangular form of gasket, the process of making that gasket, and a closure employing that gasket, shown in Figs. 9 and 10 of this application, are made the subject matter of two divisional applications, Serial Nos. 428,972, and 428,973, filed April 24 1908.

I claim as my invention:—

1. The process of making ring gaskets from a tube of gasket material, which consists in separating the rings from the tube by circumferential cuts through the wall of the tube in alternately different angular relation to the longitudinal center of the tube.

2. The process of making uniform ring gaskets from a tube of gasket material which consists in separating the rings from the tube, by circumferential cuts alternately differing in angular relation to the longitudinal center of the tube, to form the alternate rings of reverse contour, and then reversing the alternate rings to bring them all to uniform contour.

3. The process of making ring gaskets from a tube of gasket material, which consists in severing the rings from the tube by circumferential cuts penetrating the wall of the tube at an acute angle with the said longitudinal center of the tube, the alternate cuts being oppositely inclined relative to the said longitudinal center of the tube.

4. The process of making ring gaskets from a tube of gasket material, which consists in severing the rings from the tube by circumferential cuts penetrating the wall of the tube at an acute angle with the longitudinal center of the tube, the alternate cuts being oppositely inclined and at equal angles relative to the longitudinal center of the tube.

5. The process of making ring gaskets from a tube of gasket material, which consists in rotating the tube upon its longitudinal center as an axis; and cutting the rings therefrom by penetrating the wall of the rotating tube by a cutting tool at the desired intervals in alternately differing angular relation to the longitudinal center of the tube.

6. The process of making acute angled ring gaskets from a tube of gasket material, which consists in rotating the tube upon its longitudinal center as an axis, and cutting the rings therefrom by penetrating the wall of the rotating tube, with a cutting tool, in alternately differing angular relation to the said axis, to form the alternate rings of reverse contour, and then reversing the alternate rings to bring them all to uniform contour.

In testimony whereof I have signed my name to this specification in the presence of two subscribing witnesses.

WILLIAM A. LORENZ.

Witnesses:
H. MALLNER,
JANETTE S. ELLSWORTH.